United States Patent
Walters et al.

(10) Patent No.: US 12,548,002 B2
(45) Date of Patent: Feb. 10, 2026

(54) SYSTEMS AND METHODS FOR AUTOMATED BILL SPLITTING

(71) Applicant: Capital One Services, LLC, McLean, VA (US)

(72) Inventors: Austin Walters, Columbia, TN (US); Grant Eden, San Francisco, CA (US); Galen Rafferty, Mahomet, IL (US); Jeremy Goodsitt, Champaign, IL (US); Samuel Sharpe, Cambridge, MA (US); Anh Truong, Champaign, IL (US); Brian Barr, Schenectady, NY (US); Christopher Wallace, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 221 days.

(21) Appl. No.: 18/324,062

(22) Filed: May 25, 2023

(65) Prior Publication Data

US 2024/0394680 A1    Nov. 28, 2024

(51) Int. Cl.
| | |
|---|---|
| G06Q 20/14 | (2012.01) |
| G06Q 20/10 | (2012.01) |
| G06Q 20/32 | (2012.01) |
| G06Q 20/38 | (2012.01) |
| G06Q 20/40 | (2012.01) |
| G06Q 30/04 | (2012.01) |
| G06V 40/16 | (2022.01) |
| G10L 17/00 | (2013.01) |

(52) U.S. Cl.
CPC ........... *G06Q 20/14* (2013.01); *G06Q 20/102* (2013.01); *G06Q 20/322* (2013.01); *G06Q 20/3821* (2013.01); *G06Q 20/405* (2013.01); *G06Q 30/04* (2013.01); *G06V 40/172* (2022.01); *G10L 17/00* (2013.01)

(58) Field of Classification Search
None
See application file for complete search history.

(56) References Cited

U.S. PATENT DOCUMENTS

| | | | |
|---|---|---|---|
| 10,002,397 | B2 | 6/2018 | Rose |
| 10,282,713 | B2 | 5/2019 | Ham |
| 10,679,207 | B1 | 6/2020 | Huffines et al. |
| 10,839,060 | B1 | 11/2020 | Hurlocker et al. |
| 11,037,154 | B1* | 6/2021 | Costilla ............... G06Q 20/10 |
| 11,068,867 | B1 | 7/2021 | Tucker |
| 11,158,009 | B2 | 10/2021 | Barman |

(Continued)

FOREIGN PATENT DOCUMENTS

KR    20190096036 A    8/2019

*Primary Examiner* — Divesh Patel
(74) *Attorney, Agent, or Firm* — TROUTMAN PEPPER LOCKE LLP; Christopher J. Forstner; John A. Morrissett

(57) ABSTRACT

Disclosed embodiments may include a system for providing automated bill splitting. The system may receive speech data. The system may identify, from the speech data and using natural language processing, one or more users. The system may determine, from the speech data and using natural language processing, orders of the one or more users. The system may determine, from the speech data and using natural language processing, rules for the orders of the one or more users. The system may process one or more payments for the orders based on the rules and one or more credentials associated with the one or more users.

20 Claims, 4 Drawing Sheets

(56) References Cited

U.S. PATENT DOCUMENTS

| | | | |
|---|---|---|---|
| 11,195,156 | B2 | 12/2021 | Ham |
| 2009/0039150 | A1 | 2/2009 | Lay |
| 2014/0330654 | A1 | 11/2014 | Turney et al. |
| 2015/0120345 | A1* | 4/2015 | Rose .................... G06Q 20/326 |
| | | | 705/5 |
| 2015/0294292 | A1 | 10/2015 | Michishita et al. |
| 2015/0348144 | A1* | 12/2015 | Zamer .................... G06Q 30/04 |
| | | | 705/40 |
| 2017/0256007 | A1 | 9/2017 | Barman |
| 2020/0160296 | A1* | 5/2020 | Park ................... G06Q 20/3223 |
| 2020/0334724 | A1 | 10/2020 | Garrett |
| 2021/0097511 | A1 | 4/2021 | Kim |
| 2022/0005045 | A1* | 1/2022 | Wu ........................ G06V 40/16 |
| 2024/0331370 | A1* | 10/2024 | Shen ...................... G06V 10/40 |

* cited by examiner

SYSTEMS AND METHODS FOR AUTOMATED BILL SPLITTING

FIELD

The disclosed technology relates to systems and methods for automated bill splitting. Specifically, this disclosed technology relates to automatically splitting up bills using payment rules derived by applying natural language processing to observed customer conversations.

BACKGROUND

Traditionally, when a group of people go to a restaurant to enjoy a meal together, a waiter may manually split up the bill for the group by providing bills to each individual based on what they ordered or by conversing with members of the group to determine which person(s) are going to pay for which item(s). This can be a cumbersome process that can be time consuming and yield mistakes, particularly in cases where one or more individuals intend to pay for items that they themselves did not order. Some restaurants may employ technology, such as a mobile application on a smartphone, that can allow a user to order and pay for food electronically. However, in the case where one or more individuals intend to pay for items of other individuals, it is cumbersome because it may require those individuals to gather food orders from others and input all of the orders into the mobile application together. Further, a user may not even know that they intend to pay for items ordered by another until the meal has concluded, in which case use of a mobile application that may require knowledge of what items a user is going to order and pay for up front becomes impractical for that purpose. Splitting up and paying for a bill at the conclusion of a meal is often a cumbersome process that can waste time and disrupt the flow of an evening. Thus, there is a need for a more seamless manner of splitting up a bill.

Accordingly, there is a need for improved systems and methods for automated bill splitting. Embodiments of the present disclosure are directed to this and other considerations.

SUMMARY

Disclosed embodiments may include a system for automated bill splitting. The system may include one or more processors, and memory in communication with the one or more processors and storing instructions that, when executed by the one or more processors, are configured to cause the system to provide automated bill splitting. The system may receive speech data. The system may identify, from the speech data and using natural language processing, one or more users. The system may determine, from the speech data and using natural language processing, orders of the one or more users. The system may determine, from the speech data and using natural language processing, rules for the orders of the one or more users. The system may process one or more payments for the orders based on the rules and one or more credentials associated with the one or more users.

Disclosed embodiments may include a system for automated bill splitting. The system may include one or more processors, and memory in communication with the one or more processors and storing instructions that, when executed by the one or more processors, are configured to cause the system to provide automated bill splitting. The system may receive speech data. The system may receive video data. The system may identify, from the speech data and the video data, using a first machine learning model and speech embeddings, one or more users. The system may determine, from the speech data and the video data, orders of the one or more users. The system may determine, from the speech data and the video data, rules for the orders of the one or more users. The system may charge a balance to one or more associated account of the one or more users based on the rules.

Disclosed embodiments may include a system for automated bill splitting. The system may include one or more processors, and memory in communication with the one or more processors and storing instructions that, when executed by the one or more processors, are configured to cause the system to provide automated bill splitting. The system may receive speech data. The system may receive video data. The system may identify, from the speech data and the video data, using a first machine learning model and speech embeddings, one or more users. The system may determine, from the speech data and the video data, orders of the one or more users. The system may determine, from the speech data and the video data, rules for the orders of the one or more users. The system may determine, from the rules, that long-term storage is required. The system may store a reminder for a first user based on the rules, the speech data, and voice data. The system may receive event data. The system may determine that the event data corresponds to the reminder. Responsive to determining that the event data corresponds to the reminder, the system may transmit, to the first user, the reminder.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
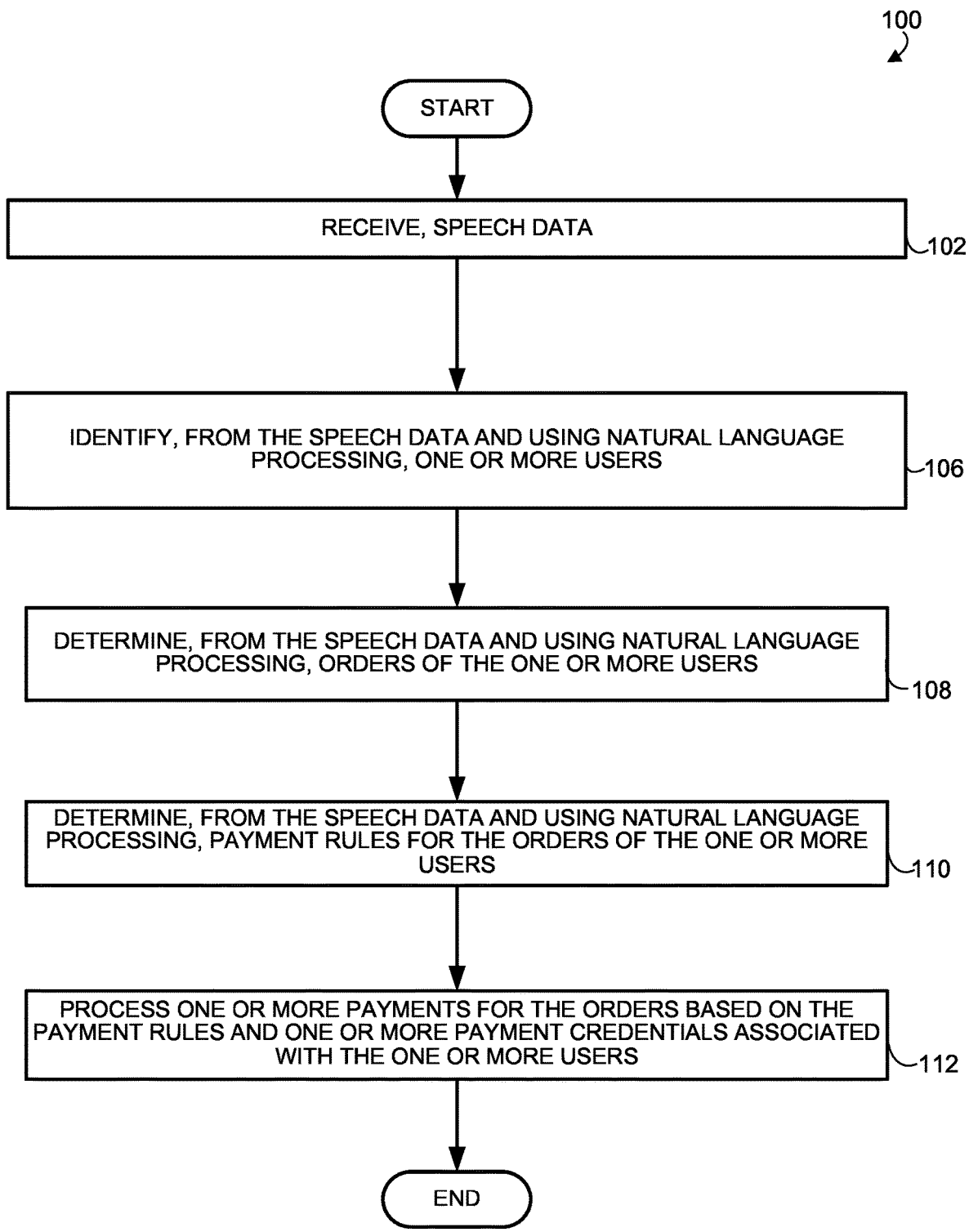
FIG. 1 is a flow diagram illustrating an exemplary method for automated bill splitting in accordance with certain embodiments of the disclosed technology.

Examples of the present disclosure related to systems and methods for automated bill splitting. More particularly, the disclosed technology relates to automatically splitting up bills using payment rules derived by applying natural language processing to observed customer conversations. According to some embodiments, disclosed systems and methods can, for example, receive speech data representing the conversation of a plurality of individuals at a table of a restaurant, determine what food/drink items each person ordered, determine rules for splitting up the bill based on utterances of the plurality of individuals and then automatically split up the bill in accordance with the determine rules. Thus, for example, if five friends go to lunch, the system may determine what each of the five people ordered and then determine for example, that all of the items of the first two people should be put on the first person's bill in response to hearing the first person say "We're together and I got it." can determine that all of the fifth's person's items should be put on the third person's bill in response to hearing the third person say "Hey John, let me get your meal this time, you got me last time" and that the fourth person's bill should contain all of the items they individually ordered. By passively listening and automatically splitting up the bill based on the user's conversation, the system can reduce the friction and annoyance typically associated with the process of sorting out which ordered items go on which person's bill, particularly in cases where order items may be split among many people (e.g., if two users split an appetizer) or if a person desires to pay for one or more ordered items of another user.

The systems and methods described herein utilize, in some instances, machine learning models, which are necessarily rooted in computers and technology. Machine learning models are a unique computer technology that involves training models to complete tasks and make decisions. The present disclosure details using natural language processing techniques that can utilize machine learning models to identify users, orders and rules based on speech and/or video data. Using a machine learning model in this way may allow the system to automatically determine who ordered which items and automatically split up a bill in accordance with the rules derived from the users' conversation. This is a clear advantage and improvement over prior technologies that rely on manual inputs because manually inputting who will pay for what can be time-consuming and cumbersome and in particular, can present a significant disruption to desired social interactions in the context of a restaurant experience. The present disclosure solves this problem by eliminating the need for an end of meal back and forth about who will pay for what by automatically determining which users will pay for which ordered items based on the conversation of the users. Furthermore, examples of the present disclosure may also improve the speed with which computers can process payments for ordered items by seamlessly determining what the bill should be and utilizing stored payment credentials to process the payment. Further, embodiments of the disclosed technology may utilize, in some instances, graphical user interfaces (GUIs), which are necessarily rooted in computers and technology. Graphical user interfaces are a computer technology that allows for user interaction with computers through touch, pointing devices, or other means. The present disclosure details presenting a user with an automatically split bill via a GUI, which can allow the user to verify or modify the bill as appropriate prior to processing payment for the bill. This, in some examples, may involve using speech data processed using natural language processing to dynamically change the graphical user interface so that the GUI may automatically update one or more bills based on the users' intentions to pay for various items (as determined as a result of the natural language processing), which involves using a microphone and/or camera to obtain near-real time speech data and/or video data to be processed by the system. Further, embodiments of the disclosed technology may provide technical improvements of performing dynamic real-time allocations based on speech data. For example, in some embodiments, based on the speech data, the system may automatically associate ordered items with particular individuals and dynamically allocate items to each user's bill in response to ongoing conversations of the users observed by the system. The system may provide a technical improvement of enabling the computing system to passively identify which individual is speaking and generate rules in near real-time to perform allocations based on their speech, allowing the system to dynamically allocate (i.e., initially allocate and if applicable, intermittently reallocate in accordance with the evolving understanding of the collective users as expressed by their utterances) resources in near-real time without any directed input from a user. Further, in some embodiments, the system provides for the automated execution of one or more transactions based on the rules that are dynamically generated in near-real time based on the speech data, thereby providing a new functionality in which, for example, a group of users can order a meal at a restaurant, dynamically allocate responsibility for the ordered items and pay for the meal in accordance with the desired allocation simply by passively (i.e., without utilizing predetermined voice commands directed at the system) talking among themselves. Overall, the systems and methods disclosed have significant practical applications in the food ordering system field because of the noteworthy improvements of the automated bill splitting system, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for automated bill splitting, in accordance with certain embodiments of the disclosed technology. The steps of method 100 may be performed by one or more components of the system 400 (e.g., bill splitting system 320 or web server 410 of payment processing system 408 or user device 402), as described in more detail with respect to FIGS. 3 and 4.

In block 102, the bill splitting system 320 may receive speech data. According to some embodiments, the bill splitting system 320 may include a microphone for receiving speech data. For example, the bill splitting system 320 may receive audio recordings of one or more people talking obtained by a microphone. According to some embodiments, audio recordings may be obtained via one or more microphone devices that are located within a restaurant, proximate a table of a restaurant or at any other location as may be intended to record conversation of people who are anticipated to be ordering food. For example, each table of a restaurant may include one or more microphones or devices having microphones that are configured to pick up the speech of people sitting at or around the table (or other location where people might order food). According to some embodiments, speech data may be recorded by a microphone of user device 402 and relayed to the bill splitting system 320 via network 406.

In block 106, the bill splitting system 320 may identify, from the speech data and using natural language processing, one or more users. According to some embodiments, the bill splitting system 320 may identify a number of unique users based on analysis of the traits of their voice (e.g., tone, pitch, frequency, volume, etc.) and/or using by using image data to visually identify the number of users (e.g., number of people sitting at a table at a restaurant). In some embodiments, the bill splitting system 320 may identify one or more users by associating a name with a voice by using natural language processing. For example, if a first user says "Hi John, how are you doing?" and a second user responds "Hi, I'm doing great!" then, using natural language processing, the bill splitting system 320 may determine that "John" is the identity of the second user.

According to some embodiments, the bill splitting system 320 may identify the number of users that are present at a relevant location (e.g., the number of people eating together at a table of a restaurant) and then may attempt to determine an identification of each user, including whether one or more users have been previously identified by the bill splitting system. For each user, the bill splitting system 320 may maintain a conversation history by, for example, applying voice recognition to the user's utterances to determine what words each user is saying, and then storing a record of the conversations associated with the users. Such conversation histories can be used by the bill splitting system 320 during a present event to determine how a bill should be split among the users and/or may be used by the bill splitting system 320 during future events to determine whether previous conversations between users may affect how a future bill may be split. As described below in blocks 108 and 110, in some embodiments, the bill splitting system 320 may apply natural language programming techniques to the user utterances/conversation history to extract users' orders (e.g., food orders) and rules for the orders that indicate how to split up the bill. According to some embodiments, the bill splitting system 320 may include a camera for receiving video data or may otherwise receive video data (e.g., video data from a user device 402). The video data may include images of faces of the one or more users. According to some embodiments, the bill splitting system 320 may process the video data to track the speech of the one or more users and verify, using the video data and facial recognition, an identity of the one or more users. According to some embodiments, the one or more users can be identified by a trained machine learning model using speech embeddings and image analysis from the video data. Thus, in some embodiments, the video data can be used to confirm a user's identity as determined based on the speech data by, for example, searching for a stored identification of John in a database of images, such as social network profiles and comparing one or more names observed by the bill splitting system 320 in the speech data. In some embodiments, one or more users may be preregistered with the bill splitting system 320 such that the system may already store the user's identity and must only associate the proper user utterances with the correct user identity. In other words, the user may have an account with the bill splitting system 320 that stores information about the user, such as for example, one or more of the user's name, image(s) of the user, voice samples of the user and/or a user's payment information (e.g., a credit card of user). According to some embodiments, the system may use machine learning model(s), computer vision techniques natural language processing and/or stored data associated with a user (e.g., stored images and/or voice samples) to identify one or more users at an event (e.g., at a table of a restaurant). As will be understood by those of skill in the art, varying identification metrics may utilize different models or an ensemble of models to group traits to identify users. For example, in some embodiments, convolutional neural networks may be used for image/facial recognition (e.g., to recognize a user based on appearance), signal processing machine learning models may be used for audio data processing (e.g., to identify a user based on the sound of their voice), and phrases may be process using long short-term memory models and/or transformer deep learning models (e.g., to identify a user based on words used by the user and/or speech patterns of the user). It is contemplated that in various embodiments, one, some or all of these techniques may be used in various combinations to identify users.

According to some embodiments, the bill splitting system 320 may identify all users at a table (or other area in which food is ordered) of a restaurant in accordance with the techniques described herein. If the system is not able to identify a particular user by name, then the system may simply assign that user an alias (e.g., "John Doe1") with which to associate their speech until enough information is gathered to make an identification of the user by the system.

In block 108, the bill splitting system 320 may determine, from the speech data and using natural language processing, orders of the one or more users. An order may refer to a food, drink, or other type of item that was ordered by a user. For example, many users may be sitting at a table at a restaurant and determining orders of the one or more users may involve determining what food and drink items each user ordered. Thus, according to some embodiments, as a result of this step, the bill splitting system 320 may establish a record of items (e.g., food and drink items) that have been ordered by users of the system and an identification of which user ordered which item(s).

According to some embodiments, the bill splitting system 320 may determine orders of the one or more users by applying voice recognition and/or natural language programming (NLP) techniques to the speech data to identify food and/or drink items ordered by the one or more users and associate each ordered item with the respective user who ordered it. For example, if a first user says "I'll have a hamburger," the bill splitting system 320 may determine that that user has ordered a hamburger. If the next user says then says "I'll have the same," then the bill splitting system 320 may determine that the second user has also ordered a hamburger. By using voice recognition and natural language processing, the bill splitting system 320 can determine what items were ordered by which people.

In some embodiments, the bill splitting system 320 may utilize a camera and video data to assist in identifying which person is speaking when an order is being made to help identify who is ordering what. In some embodiments, the bill splitting system 320 may be configured to apply image recognition techniques to recognize items placed in front of particular users to help determine who ordered which items. For example, the bill splitting system 320 may recognize that a hamburger has been placed in front of a first user to help determine that the first user ordered a hamburger. In some embodiments, different forms of analysis, such as the natural language processing of user utterances and analysis of video/image data to determine who is speaking and/or what items are placed in front of particular people can be used in combination to identify who is speaking and what a person has ordered.

According to some embodiments, the bill splitting system 320 may verify the orders of the one or more users using the video data. For example, image recognition/analysis techniques may be used to determine that for example, when the phrase "I'll have a hamburger" is spoken, that the user John's mouth is concurrently moving, thereby allowing the bill splitting system 320 to verify that it was John who made the statement (e.g., in addition to use of voice recognition or other audio analysis to associate that statement with John). According to some embodiments, the bill splitting system 320 may perform video analysis using, for example, machine learning models trained to read lips, to further assist in determining and verifying what a particular user is saying.

According to some embodiments, the bill splitting system 320 may associate each ordered item (as determined by the techniques described above) with a menu item and a corresponding price. For example, in some embodiments, the bill splitting system 320 may have access to a menu or library of menu items associated with the restaurant and may be able to associate ordered items with items on the menu and their associated price. If the menu lists different types of hamburgers such as for example, a "hamburger," a "cheeseburger," a "double burger," a "steak burger," and a "swiss and mushroom burger", the bill splitting system 320 may use natural language processing to analyze the words spoken by the people at the table (e.g., a back and forth between a customer and a waiter) and identify the type of item being ordered and associate the order with a particular menu item (e.g., "a steak burger"). According to some embodiments, the bill splitting system 320 may select the menu item that best matches the utterances of a user. The bill splitting system 320 may utilize speech recognition and/or natural language processing to determine each word being uttered by users with an associated degree of confidence. The degree of confidence may be increased if one or more words uttered by a user match corresponding words associated with a menu item. For example, if the bill splitting system 320 determines, with an 80% confidence based on speech recognition, that a user uttered "steak burger," upon accessing the menu and determining that "steak burger" is listed on the menu the bill splitting system 320 may increase the confidence of the identification of the determined word (e.g., to 95%). In some embodiments, if the confidence of the identification of an utterance is below a predetermined threshold (e.g., 90%), then the bill splitting system 320 may use the determination as a placeholder and await further utterance data that may provide more confidence to the identification, or may take some action to clarify the identification of the utterance, such as for example, prompting the user to input clarification via a software application running on a mobile device of the user. Thus, in some embodiments, if the bill splitting system 320 cannot determine what menu item an ordered item corresponds to, the system may generate a prompt to a user or restaurant employee to manually select a menu item that corresponds to the utterances associated with the ordered item identified by the bill splitting system 320.

In some embodiments, all of the ordered items may have already been electronically recorded either by a waiter or a user (e.g., by inputting an order using user device 402), in which case the bill splitting system 320 may be able to access the electronic receipt (e.g., via web server 410) and reference items already entered on the bill to determine which user has ordered which menu items and what each ordered item costs.

In block 110, the bill splitting system 320 may determine, from the speech data and using natural language processing, rules (e.g., payment rules) for the orders of the one or more users. According to some embodiments, rules for the orders may refer to one or more instructions to be applied to split up a bill. In some embodiments, the bill splitting system 320 may begin with a default rule that is modified by rules that are determined based on the speech data. The default rule may be a rule that specifies that each individual is responsible for paying for the items they respectively ordered. Thus, if no rules for the orders are determined based on the speech data, the bill splitting system 320 may split the bill in a manner that assigns costs to each user that correspond to the items they individually ordered. According to some embodiments, rules of the orders that are determined by speech data and using natural language processing may include assigning one or more bill items ordered by one or more individuals to the bill of another individual, assigning all items ordered by all individuals to the bill of one specified individual, splitting the cost of a single item evenly among two or more users and assigning the split cost to the bill of each of the two or more users, or any other such type of rule that may result in the cost of items listed on a bill to be assigned to or split with one or more users. For example, if John says "Don't worry about it, this one's on me." the bill splitting system 320 may determine that a rule for the orders that indicates that all food items are to be placed on John's bill. In another example, John may say to Jane, "Do you want to split some nachos with me?" and when Jane replies "Sure that sounds great," the bill splitting system 320 may determine a rule for the orders that indicates that the cost of the nachos item should be split between John and Jane's respective bills. According to some embodiments, the rules can be determined based on an identified intent to pay for (or split payment for) one or more food items as determined by the bill splitting system 320 by applying natural language processing to the speech data. Such determinations can be made based on explicit declarations of intent (e.g., "I will pay for that") or inferred based on the context of the order (e.g., "Let's split nachos" suggests the bill will be split absent any other superseding rule).

As will be understood by those of skill in the art, the bill splitting system 320 may utilize one or more trained machine learning models to determine rules based on the speech data. For example, as will be understood by those of skill in the art, one or more machine learning models may be trained using previous examples of speech data and known rules that were determined based on the speech data to generate rules associated with new sets of speech data input into the model(s). In some embodiments, the bill splitting system 320 may utilize a rule based system to determine payment rules for the orders. For example, a rule-based system may utilize natural language programming techniques to parse user utterances to generate rules based on the order of certain words in a sentence. For example, a rule-based system may look for the word "pay" in a sentence and then may look before the word for a word indicating an identity of an actor (e.g., "I", "he", "you", "Mark," etc.) and one or more words following the word "pay" to identify one or more aspects of an order (e.g., "pizza", "meal," "drinks," etc.). Thus, for example, the bill splitting system 320 may apply a rule-based system to the utterance "Mark said he would pay for the drinks," to determine a rule that indicates that the user identified as Mark will pay for the portion of the orders corresponding to drinks.

According to some embodiments, the determined rules can be applied to automatically determine how a bill should be split up to generate an automatically split bill. For example, if a rule indicates that John is going to pay for everyone, then the bill splitting system 320 will assign all ordered items to John's bill for payment. In some instances, one or more rules may contradict one another, in according to some embodiments, the most recently determined rule among contradictory rules will be executed. For example, if John says "I'll pay for this meal," the bill splitting system 320 may determine a rule indicating that John will pay for everything, however if Jane responds "No, you got it last time, this time's on me." then a new rule will indicate that Jane will pay for everything, in which case the bill splitting system 320 may either replace the prior rule with the new rule or simply only execute the new rule when determining what the bill will be.

According to some embodiments, the bill splitting system 320 may verify the rules using the video data in a manner similar to that described above with respect to use of video data to verify orders.

In block 112, the bill splitting system 320 may process one or more payments for the orders based on the rules and one or more credentials associated with the one or more users. In some embodiments, the bill splitting system 320 may receive payment credentials or have previously stored payment credentials from one or more users that it may use to process payment of a bill. For example, the bill splitting system 320 may have access to stored credit card information of one or more users or may receive credit card information by a user scanning their credit card with a scanner associated with the bill splitting system 320 (e.g., via a check out kiosk of the restaurant, a handheld device of a waiter or via user device 402). According to some embodiments, the bill splitting system 320 may process multiple payments by multiple users in accordance with a split bill such that each user pays for the ordered items as determined by the rules derived based on the application of natural language processing to the speech data. In this way, according to some embodiments, a group of people can attend a meal at a restaurant, and by simply ordering their meals and conversing about who will pay for what, the bill splitting system 320 can automatically split up the bill and process payments for each bill in response to receiving or accessing stored payment credentials.

In some embodiments, the payment(s) may be processed automatically in accordance with the amounts owed according to the automatically split bill in response to the bill splitting system 320 determining that a termination condition has been met. A termination condition may be a condition that indicates that the event for which the bill has been generated is over and no more items will be added to the bill prior to payment. For example, a termination condition may be when a meal has ended or when people have finished ordering items for a meal. According to some embodiments, the bill splitting system 320 may determine that a termination condition has occurred by, for example, determining that a user has asked for the bill based on user utterances, determining that a user has asked for the bill based on a user input into a software application running on a user device that corresponds to a request for a bill, by determining, based on video/image data, that users have stopped eating for a predetermined amount of time, or any other such condition that may be determinable by the bill splitting system 320 that may indicate that users may be ready to settle up a bill.

In some embodiments, the users may be prompted to verify agreement with the automatically split bill prior to payment being executed by being presented with a copy of the automatically split bill, such as via a print-out of the bill handed to them by a waiter, a digital display of the bill on a display screen associated with the restaurant, via a mobile application on user device 402 or any other suitable way of relaying bill information to a user. According to some embodiments, modifications to the bill may be manually made by a user (e.g., input using a software application on a computing device at the restaurant or a user device 402 of the user) prior to processing of the payment. For example, if a user decides they do not want to pay for an item that was assigned to them by the bill splitting system 320, then the user may opt to reassign that item to the user who originally ordered the item or to another user who agrees to pay for the item.

According to some embodiments, the bill splitting system 320 may be operated on a smartphone of one or more users, a mobile device of a waiter, a pay-at-the-table device, or combinations thereof.

Figure 2:
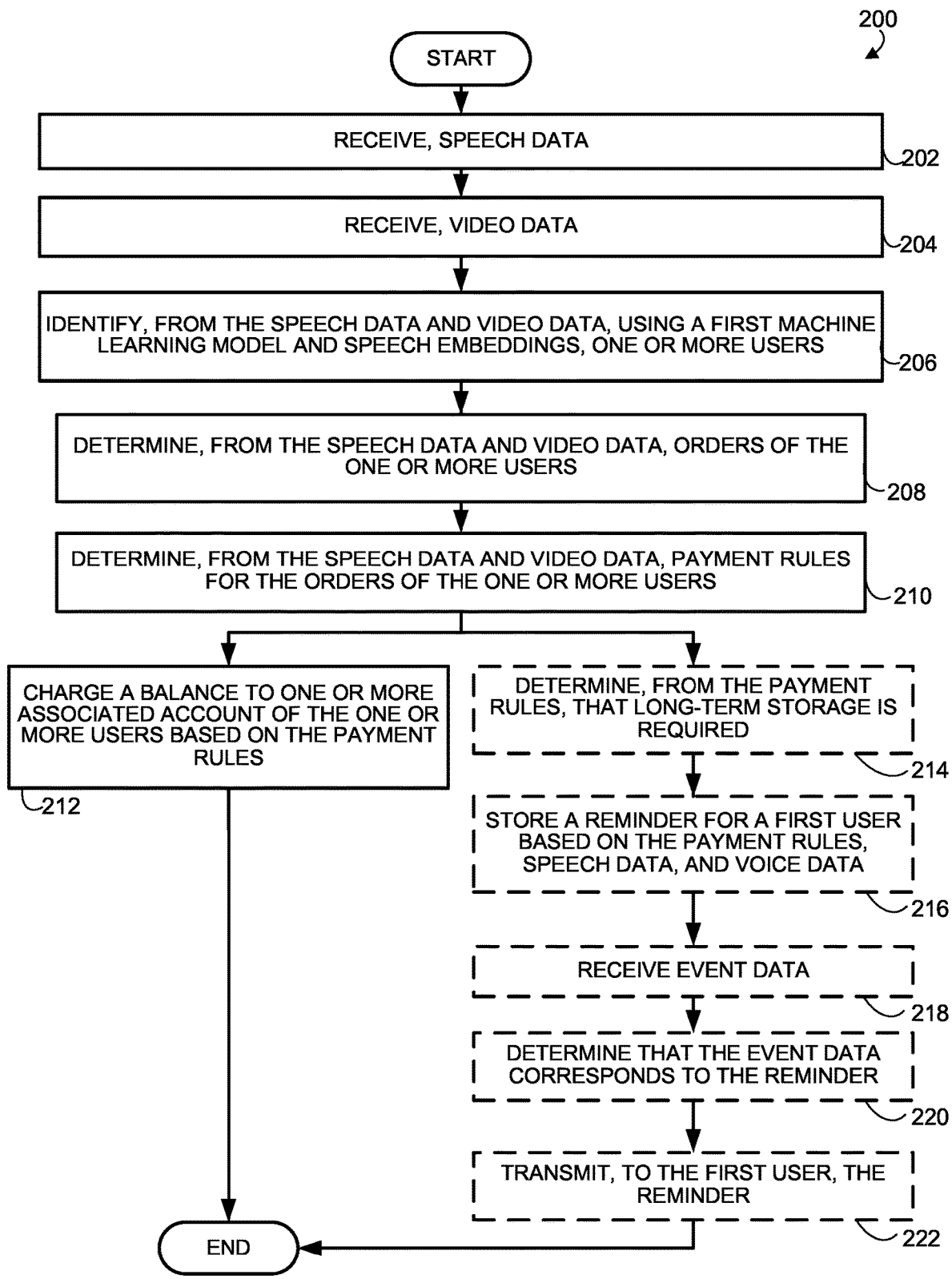
FIG. 2 is a flow diagram illustrating an exemplary method for automated bill splitting in accordance with certain embodiments of the disclosed technology.

FIG. 2 is a flow diagram illustrating an exemplary method 200 for automated bill splitting, in accordance with certain embodiments of the disclosed technology. The steps of method 200 may be performed by one or more components of the system 400 (e.g., bill splitting system 320 or web server 410 of payment processing system 408 or user device 402), as described in more detail with respect to FIGS. 3 and 4.

In block 202, the bill splitting system 320 may receive speech data in a manner similar that of block 102 of FIG. 1 described previously above.

In block 204, the bill splitting system 320 may receive video data. For example, in some embodiments, one or more digital video cameras may be configured to obtain video data of one or more people sitting at a table in a restaurant. One or more video cameras may be configured in manner that they can view one or more people's faces and record movements of the people's mouths as they speak. One or more video cameras may be positioned in a manner such that they can view and record the placement of food or drink items relative to one or more people at the table. According to some embodiments, the bill splitting system 320 may receive video data from one or more digital video cameras positioned at a restaurant (or other such location) and/or video data from one or more user devices 402.

In block 206, the bill splitting system 320 may identify, from the speech data and the video data, using a first machine learning model and speech embeddings, one or more users. According to some embodiments and as will be appreciated by those of skill in the art, the bill splitting system 320 may process the video data to perform common object/person identification using one or more deep learning machine learning models and/or one or more vector based models that utilize facial keypoints for identification. According to some embodiments, the bill splitting system 320 may convert speech data into respective speech embeddings of the audio signal/speech data and the words used by using voice to text identification. For situations in which an unknown number of users are present, the bill splitting system 320 may cluster groupings of the speech embeddings and determine distances that separate speech patterns relative to a threshold. For example, if there are 5 unknown users, the bill splitting system 320 may record utterances of each user in the audio data, extract speech embeddings from the audio data, plot the speech embedding data and applying clustering techniques to group the data, wherein speech embeddings that are clustered together and/or are within a predetermined distance metric of one another may be considered to be from the same user. In other words, utterances that correspond to the word embeddings that are clustered together in one group may be considered to be utterances that are from one particular user (as opposed to utterances from another user).

According to some embodiments, identifying the one or more users may include associating a name with a voice using natural language processing. For example, based on the speech data, the bill splitting system 320 may determine that when a first voice says "Hi John, how are you doing?" and a second voice says "Hi Jane, I'm doing great, and you?" that the first voice is associated with a person named "Jane" and the second voice is associated with a person named "John." In some embodiments, the bill splitting system 320 may use video data to assist in identifying which person a particular voice is associated with by analyzing the images and determining who is saying what. Further, according to some embodiments, facial recognition software may be applied to the video data and compared with a database of images to associate a name with a voice. For example, video data may include images of the first person in the previous example, and by comparing the images to, for example, a database of social network profiles (or other such database that associates images with names), the bill splitting system 320 may find a social media profile having a profile picture of a face that matches that of the first user and can determine that the name associated with the social media profile (e.g., "Jane Doe") is associated with the first user.

In block 208, the bill splitting system 320 may determine, from the speech data and the video data, orders of the one or more users in a manner similar to that described above with respect to block 108. For example, the bill splitting system 320 may apply natural language processing to the voice data to identify what items are being ordered and may apply facial/image recognition techniques to the video data to identify which user is placing the order, by for example, observing a synchronization of the speech data with the observed movement of a particular user's mouth as they talk.

In block 210, the bill splitting system 320 may determine, from the speech data and the video data, rules for the orders of the one or more users in a manner similar to that described above with respect to block 110. For example, the bill splitting system 320 may apply natural language processing to the voice/speech data to identify declarations or suggestions of a user's intent to pay for one or more ordered items and may apply facial/image recognition techniques to the video data to verify which user is making the statement. According to some embodiments, the bill splitting system 320 may be configured to determine rules based on the video data by analyzing gestures in combination with analysis of speech data. For example, a first user might say "Who is going to pay for this?" and without saying anything, a second user may raise their hand to indicate their intent to pay and, based on this detected gesture, the bill splitting system 320 may determine a rule that the second user will pay for the referenced ordered item. As will be appreciated by those of skill in the art, machine learning and/or deep learning models can be used to perform object/action identification based on the video data to, for example, identify various items (e.g., identify a food item that a user is eating) and/or actions (e.g., identify that a user raised their hand in response to a question).

According to some embodiments, the bill splitting system 320 can use a second machine learning model in determining the rules for the orders. In some embodiments, the second machine learning model can be a transformer deep learning model. As will be appreciated by those of skill in the art, transformer deep learning models use key/value attention to attend to important parts of speech, text or images. Speech, text and/or images may be input into transformer deep learning model(s), which can then output, for example, embeddings that encode semantic information that may be used to compare different information such as, for example, text and/or images. Embeddings can encode semantic information that can be used to compare these modalities through distance/similarity metrics. According to some embodiments, the bill splitting system 320 may generate rules for the orders based by creating thresholds for similarity/distance metrics associated with comparisons made using embeddings.

In block 212, the bill splitting system 320 may charge a balance to one or more associated account of the one or more users based on the rules in a manner similar to that described above with respect to block 112. According to some embodiments, the bill splitting system 320 may send a receipt to the associated account. For example, in some embodiments, the bill splitting system 320 may email or a text a receipt for the transaction to an email address of phone number associated with the user of the associated account that was used to pay for the bill.

According to some embodiments, the bill splitting system 320 may send a request for verification of the balance to a mobile device (e.g., user device 402) associated with the associated account and receive verification of the balance from the mobile device. In some embodiments, the request for verification of the balance can further include an interactive graphical user interface showing the orders of the one or more users, the rules, and/or a total. According to some embodiments, the verification of the balance may prompt the user to agree to payment of the balance prior to the balance being charged to the user's account. The graphical user interface may allow a user to modify one or more of the orders, rules and/or the total of a bill assigned to a given user. For example, in some embodiments, if the user disagrees with the balance presented in the request for verification of the balance, then system may allow the user to reject and/or manually provisionally reassign items from their bill to a bill of another user who may then accept or reject the item (e.g., using a mobile application on their own smart device). According to some embodiments, if the user wants to reassign an item from a bill to another user and the user does not want to accept it on their bill, the bill splitting system 320 may assign the item to the bill of the person who ordered the item (as determined by the bill splitting system 320 in block 208).

In block 214, the bill splitting system 320 may optionally determine, from the rules, that long-term storage is required. According to some embodiments, the bill splitting system 320 may determine that long-term storage of a rule is required in response to determining that a rule may apply to a future event. For example, if a first user says to a second user, "Thanks for the meal, next time is on me!" the bill splitting system 320 may determine a rule that indicates the user is to pay for the next meal when the first and second users next order a meal together. Thus, the bill splitting system 320 can store this rule for future usage.

According to some embodiments, determining, from the rules, that long-term storage is required may be completed by a variational autoencoder machine learning model. As will be appreciated by those of skill in the art, a variational autoencoder machine learning model may create semantic embeddings that store compressed information. Such models may utilize similar inputs and outputs as the transformer deep learning model, described above. According to some embodiments, the bill splitting system 320 may use the semantic meanings of words to determine if long term storage is required by comparing embeddings. For example, if a user utters "I'll pay for lunch next time." that speech data can be input into a variational autoencoder machine learning model, which may output embeddings that store semantic and user based qualities, which can then be compared to future user utterances embedded with the same model to determine if the user is the same and the semantics line up with agreeing to pay.

In block 216, the bill splitting system 320 may optionally store a reminder for a first user based on the rules, the speech data, and voice data. In some embodiments, the reminder may be stored in response to determining that long-term storage is required, as described in block 214. According to some embodiments, the reminder can include information intended to remind a user why the system has stored a rule. For instance, in the context of the previous example, a reminder may include information sufficient to remind the first user that they offered to pay for the meal of the second user in their next outing. According to some embodiments, the reminder may simply provide an indication of the rule, for example "It is your turn to pay for the next meal with John," or in some embodiments, the reminder may provide additional details such as the date, location, and/or cost of the prior meal with the second user to provide the first user with more context and information regarding their promise to pay for the next meal.

According to some embodiments, the reminder may be a text message, push notification, email message, or combinations thereof. As explained below with respect to blocks 218, 220 and 222, the reminder can be delivered to a user in response to determining that an event is occurring that should trigger the reminder. For example, if the reminder indicates that John is going to pay for lunch the next time John and Jane have lunch, then the bill splitting system 320 may send the reminder to John (e.g., via a user device 402 of John) if it determines that John and Jane are having lunch together again.

In block 218, the bill splitting system 320 may optionally receive event data. According to some embodiments, event data may include information about a place, people, objects and/or date/time. For example, event information may include information identifying that a user is at a restaurant, information identifying who is with the user, information identifying items the user is interacting with (e.g., ordering) and/or information indicating the date and/or time. Information indicating that a user is at a restaurant may include, for example, global positioning system (GPS) of user device 402 indicating that the user is within the bounds of a restaurant, audio data indicating the user is at restaurant (e.g., a hostess saying "Welcome to the City Café"), calendar information from user device 402 indicating that the user has an appointment at a restaurant, and/or video data indicating the user is at the restaurant (e.g., video data from user device 402 showing that the user is entering the restaurant). Information identifying who the user is with can include calendar data of one or more user devices 402 indicating a meeting between two or more users, GPS data or other electronic data (e.g., proximity communication between two or more user devices 402) of one or more user devices 402 showing the users are located within a close proximity to one another, and/or audio or video data obtained by a user device 402 that can be used to identify another user (e.g., via recognizing the other user's voice and/or face). Object information may be derived by determining a user's location and cross-referencing it with stored object data associated with the location, for example, if the GPS of a user device 402 shows that the user is at a baseball stadium, then the bill splitting system 320 may know that the user is near to hot dogs that are for sale. Object information may also be derived using sound/video data by natural language processing (e.g., if a microphone of the user device 402 picks up a voice saying "Hot dogs! Get your hot dogs here!") or image recognition as described herein. According to some embodiments, the event data can be the same merchant as a prior event, the same merchant type as the prior event, the same other users as the prior event, or combinations thereof. In other words, the event data may indicate that an event is currently occurring at, for example, the same restaurant as a prior outing, the same type of restaurant, and/or with the same people, as these are common circumstances in which a prior promise to pay for a future meal may be realized.

In block 220, the bill splitting system 320 may optionally determine that the event data corresponds to the reminder. For example, if the reminder relates to a rule that indicates that next time John and Jane go to a baseball game, John will buy the hotdogs, the bill splitting system 320 may determine that the event data indicates that both John and Jane are at a baseball game where hotdogs are being offered. According to some embodiments, determining that the event data corresponds to the reminder may involve determining that two or more people associated with the reminder are proximate each other at the same location, such as for example, two people are together at a restaurant.

In block 222, the bill splitting system 320 may optionally transmit, to the first user, the reminder. According to some embodiments, the bill splitting system 320 may cause a user device 402 to display a reminder to the user that corresponds to the stored rule. For example, a user device 402 may display (e.g., via a mobile application installed on the device) text that says, "Reminder: You offered to pay for Jane's next meal." In some embodiments, the reminder may include or reference other details relating to the origin of the stored rule. For example, user device 402 may display text that says, "Reminder: On May 1, 2022, Jane paid for your meal at the City Café and you offered to pay for her next meal."

According to some embodiments, the bill splitting system 320 may allow the user to cause a bill to be split in response to the presented reminder by receiving an input from the user, such as a voice command (e.g., "I will pay for Jane's meal.") or an input to user device 402 (e.g., the user selects a button presented along with the reminder that allows the user to split a bill as suggested by the stored rule.

Figure 3:
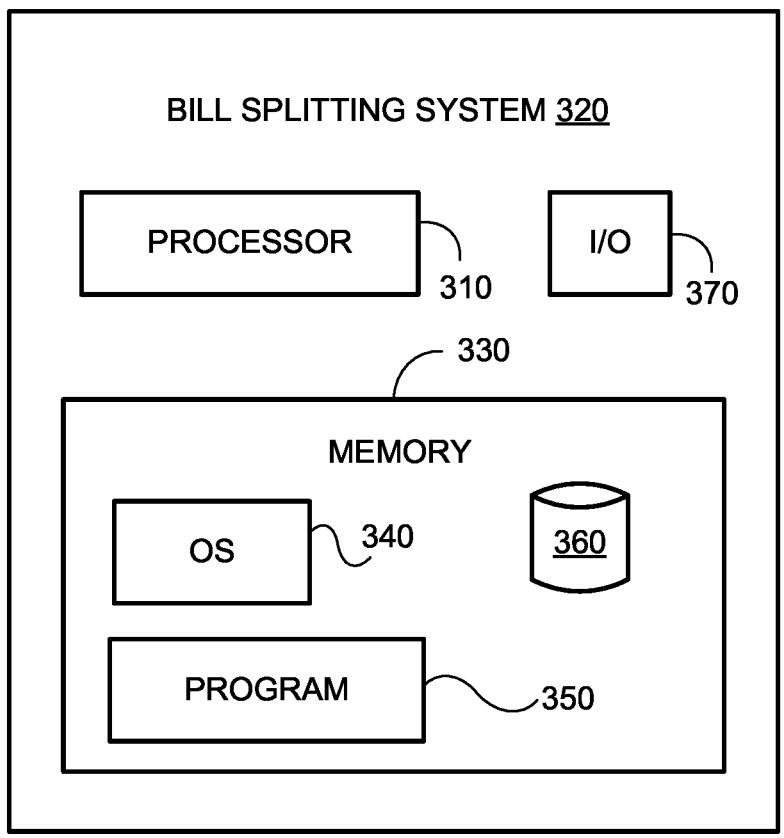
FIG. 3 is block diagram of an example bill splitting system used to provide automated bill splitting, according to an example implementation of the disclosed technology.
Figure 4:
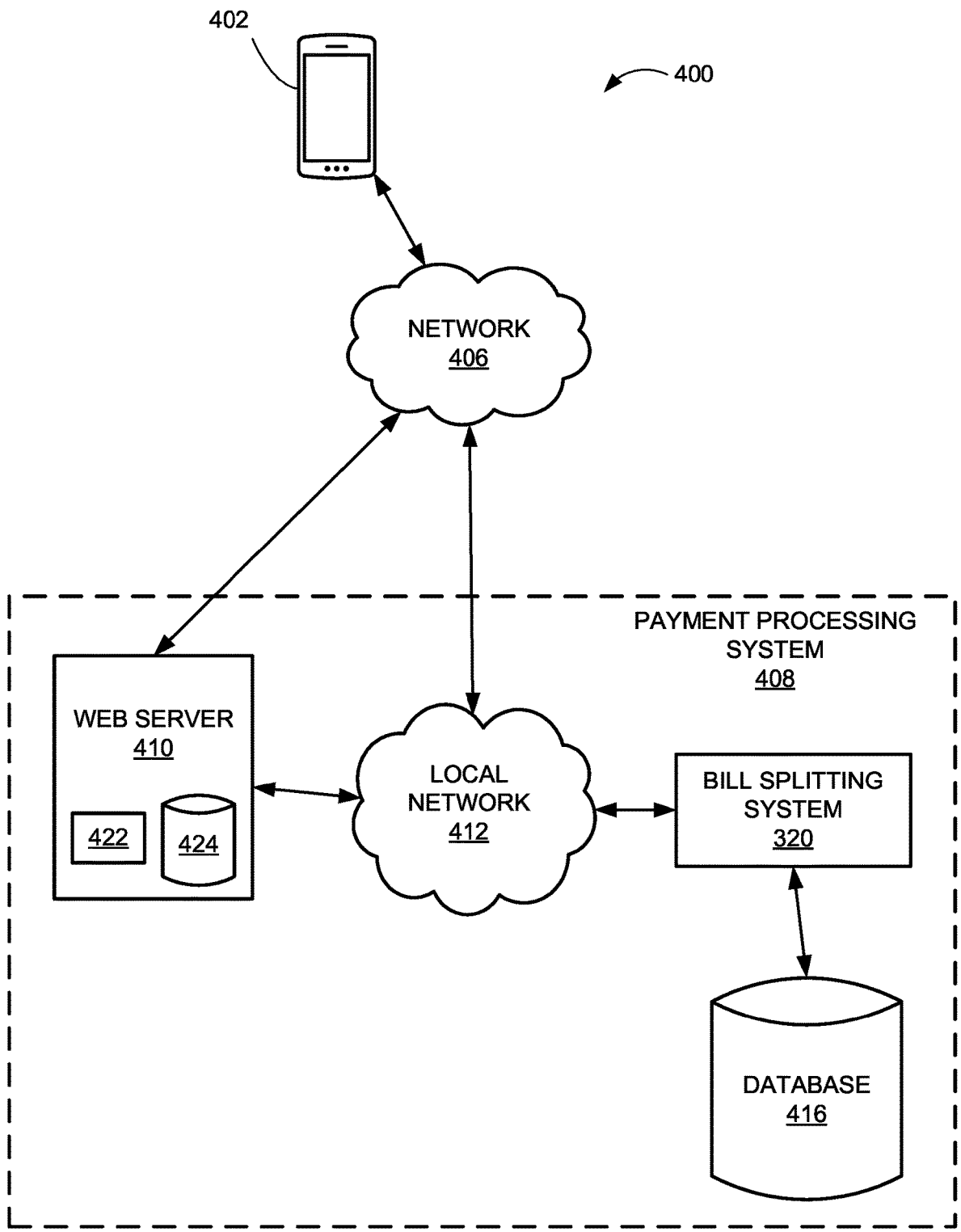
FIG. 4 is block diagram of an example system that may be used to provide automated bill splitting, according to an example implementation of the disclosed technology.

FIG. 3 is a block diagram of an example bill splitting system 320 used to automatically identify one or more users, their orders (e.g., food orders at a restaurant), and rules for the orders based on speech data and using natural language programming according to an example implementation of the disclosed technology. According to some embodiments, the user device 402 and web server 410, as depicted in FIG. 4 and described below, may have a similar structure and components that are similar to those described with respect to bill splitting system 320 shown in FIG. 3. As shown, the bill splitting system 320 may include a processor 310, an input/output (I/O) device 370, a memory 330 containing an operating system (OS) 340 and a program 350. In certain example implementations, the bill splitting system 320 may be a single server or may be configured as a distributed computer system including multiple servers or computers that interoperate to perform one or more of the processes and functionalities associated with the disclosed embodiments. In some embodiments bill splitting system 320 may be one or more servers from a serverless or scaling server system. In some embodiments, the bill splitting system 320 may further include a peripheral interface, a transceiver, a mobile network interface in communication with the processor 310, a bus configured to facilitate communication between the various components of the bill splitting system 320, and a power source configured to power one or more components of the bill splitting system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the bill splitting system 320 may include one or more storage devices configured to store information used by the processor 310 (or other components) to perform certain functions related to the disclosed embodiments. In one example, the bill splitting system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The bill splitting system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the bill splitting system 320 may include the memory 330 that may include one or more programs 350 to perform one or more functions of the disclosed embodiments. For example, in some embodiments, the bill splitting system 320 may additionally manage dialogue and/or other interactions with the customer via a program 350.

The processor 310 may execute one or more programs 350 located remotely from the bill splitting system 320. For example, the bill splitting system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a bill splitting system database 360 for storing related data to enable the bill splitting system 320 to perform one or more of the processes and functionalities associated with the disclosed embodiments.

The bill splitting system database 360 may include stored data relating speech data, video data, identifications of users, orders, rules for orders, menu items and associated costs, payment credentials, reminders and associated data. According to some embodiments, the functions provided by the bill splitting system database 360 may also be provided by a database that is external to the bill splitting system 320, such as the database 416 as shown in FIG. 4.

The bill splitting system 320 may also be communicatively connected to one or more memory devices (e.g., databases) locally or through a network. The remote memory devices may be configured to store information and may be accessed and/or managed by the bill splitting system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The bill splitting system 320 may also include one or more I/O devices 370 that may comprise one or more interfaces for receiving signals or input from devices and providing signals or output to one or more devices that allow data to be received and/or transmitted by the bill splitting system 320. For example, the bill splitting system 320 may include interface components, which may provide interfaces to one or more input devices, such as one or more keyboards, mouse devices, touch screens, track pads, trackballs, scroll wheels, digital cameras, microphones, sensors, and the like, that enable the bill splitting system 320 to receive data from a user (such as, for example, via the user device 402). According to some embodiments, the bill splitting system 320 can receive speech data and/or video data from a microphone and/or camera associated with the bill splitting system 320 or may receive speech data and/or video data transmit to it from other systems having a microphone and/or camera (e.g., user device 402).

In examples of the disclosed technology, the bill splitting system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The bill splitting system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a transformer deep learning model, a variational autoencoder model, a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The bill splitting system 320 may be configured to adjust model parameters during training. Model parameters may include weights, coefficients, offsets, or the like. Training may be supervised or unsupervised.

The bill splitting system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The bill splitting system 320 may be configured to optimize statistical models using known optimization techniques.

Furthermore, the bill splitting system 320 may include programs configured to retrieve, store, and/or analyze properties of data models and datasets. For example, bill splitting system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The bill splitting system 320 may include algorithms to determine a data type, key-value pairs, row-column data structure, statistical distributions of information such as keys or values, or other property of a data schema may be configured to return a statistical profile of a dataset (e.g., using a data-profiling model). The bill splitting system 320 may be configured to implement univariate and multivariate statistical methods. The bill splitting system 320 may include a regression model, a Bayesian model, a statistical model, a linear discriminant analysis model, or other classification model configured to determine one or more descriptive metrics of a dataset. For example, bill splitting system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The bill splitting system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, bill splitting system 320 may be configured to generate a similarity metric representing a measure of similarity between data in a dataset. A similarity metric may be based on a correlation, covariance matrix, a variance, a frequency of overlapping values, or other measure of statistical similarity.

The bill splitting system 320 may be configured to generate a similarity metric based on data model output, including data model output representing a property of the data model. For example, bill splitting system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The bill splitting system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The bill splitting system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, bill splitting system 320 is configured to generate and/or train a classification model to classify a dataset, consistent with disclosed embodiments.

The bill splitting system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. To generate prediction models, the bill splitting system may analyze information applying machine-learning methods.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

The bill splitting system 320 may include one or modules for extracting meaning from words in the speech data using speech recognition and/or natural language processing techniques. In particular, as described above, the bill splitting system 320 may utilize natural language processing techniques to identify one or more users, determine orders (e.g., food orders at a restaurant) of the one or more users, and rules for orders of the one or more users. As will be understood by those of skill in the art, natural language processing techniques can allow computing devices to extract meaning from words, such as words spoken and recorded in the speech data. Natural language processing can involve data preprocessing, which can place the data in a form more easily processed by a machine learning model, and can include techniques such as tokenization, stop word removal and part-of-speech tagging. After speech data has been pre-processed, it can be processed to extract meaning by using one or more natural language processing algorithms, such as for example a machine-learning based system that can perform tasks based on training data the model is trained on and then can be adjusted and refined as more data is fed into the model. Natural language processing algorithms can use a combination of machine learning, deep learning and neural networks to extract meaning from words.

Natural language processing techniques can involve examining syntax and semantic analysis to determine the meaning of words. Natural language programming can use syntax to assess meaning from language by using various techniques, such as parsing, word segmentation, sentence breaking morphological segmentation, and stemming. Semantics analysis can include techniques such as word sense disambiguation, named entity recognition, natural language generation and natural language understanding. Rule extraction and discovery may involve extracting general inference rules in text, audio, video, or other media.

According to some embodiments, the bill splitting system 320 can use natural language processing to identify one or more users by, for example, associating a name in the speech data with a particular user. As will be appreciated by those of skill in the art, in some embodiments, this may be achieved by, for example, using models to convert speech to text and then applying one or more named entity recognition models to the text. In some embodiments, the bill splitting system 320 can use machine learning models using speech embeddings to identify one or more users. For example, as will be appreciated by those of skill in the art, speech embeddings store semantic information about the modality and can be used to compare to other stored embedding/historical embeddings that contain information about a user and compare them using similarity metrics (e.g., cosine distance) to determine which user is most similar. According to some embodiments, the bill splitting system 320 may use rule extraction techniques for extracting rules about the orders. An example of rule extraction may be extracting the rule that "When a person turns on a light, the light will light up" from "Matt turned on the light, but it didn't light up." In the context of people paying for meals at a restaurant, the bill splitting system 320 may extract rules that indicate which users intend to pay for which items. For example, from the statement "I'll pay for John's meal," the bill splitting system 320 may extract a rule that the user who spoke the phrase is going to pay for all of the items ordered by the user named John. As described herein, the determined rules may be used to automatically split a bill by applying the rules to determine which ordered items should be assigned to each user's bill (if any).

According to some embodiments, the bill splitting system 320 may receive and process video data to aid the natural language processing system in identifying users and determining orders and rules, by for example, visually determining which users are speaking which words by tracking the movement of the users' mouths as they speak. In some embodiments, the bill splitting system 320 may utilize one or more machine learning models to recognize when a particular user is speaking, which can be synchronized with the speech data to determine which user said which utterance.

According to some embodiments, the bill splitting system 320 may include a payment processing module that can process payment of one or more bills after the bill splitting system 320 has automatically split the bill based on the determined rules. The bill splitting system 320 may store or receive payment credentials (e.g., credit card credentials) that can then be used to process a payment of a bill. The bill splitting system 320 may store other information associated with a user, such as an address, phone number and/or email address and may be configured to automatically send a receipt to the user (e.g., via email) following processing of a payment. In some embodiments, the bill splitting system 320 may receive payment credentials from a user via a scanning device disposed at a restaurant, via mobile device 402, via the speech data or video data (i.e., credit card number is spoken or displayed to the camera), or any other suitable method.

According to some embodiments, the bill splitting system 320 may include a payment verification module that can verify a payment with a user prior to processing the payment. For example, after automatically splitting a bill, the bill splitting system 320 may be configured to present the portion of the bill assigned to each user to each user for verification. In some embodiments, bills may be presented on a graphical user interface (GUI) of a display screen located at a restaurant (e.g., at or near the table) and may include user inputs (e.g., buttons) to allow a user to verify the bill or reject or modify the bill prior to payment. For example, if the bill presented to a user lists an ordered item for payment that the user does not intend to pay for, then the GUI may provide the user with options to reassign payment responsibility for the ordered item to another user who accepts the payment responsibility for the ordered item. According to some embodiments, a GUI that allows users to verify or reject the bill may be presented using a mobile application of a user device 402 that communicates with the bill splitting system 320 via network 406. In some embodiments, the GUI may allow a user to make other adjustments to a bill, such as applying gift cards or leaving or modifying a tip. According to some embodiments, the GUI may allow a user to dispute a bill item if for example the user believes they did not order an item they are charged with or the wrong item is listed on the bill, in which case the bill splitting system 320 may be configured to send a communication to an employee of a restaurant who may review the ordered items and manually determine whether an ordered item is accurately represented on the bill and either input a modification to the bill or verify the accuracy of the bill (e.g., via a user device 402 at the restaurant).

According to some embodiments, the bill splitting system 320 may include a reminder module for storing reminders, monitoring events and issuing reminders based on the occurrence of corresponding events. For example, the bill splitting system 320 determines that John has said to Jane "Thanks for lunch, next time we come here lunch is on me!" then the bill splitting system 320 may store a reminder that indicates that the next time John and Jane have lunch at that restaurant John has promised to pay for the lunch. The bill splitting system 320 can receive event data, such as data indicative of John and Jane's presence at that restaurant (e.g., GPS data, calendar appointment data, face/voice recognition from video/speech data of the restaurant, etc.) and monitor the event data to determine when the conditions for the reminder are met. In this example, the rule determined and stored by the bill splitting system 320 indicates that John will pay for the next lunch that John and Jane have at this restaurant, so the bill splitting system 320 will monitor the event data for data indicating that John and Jane are having another lunch at the specified restaurant. When the bill splitting system 320 determines that that event is occurring, then the bill splitting system 320 may issue the reminder to John via, for example, a text message, a push message in a mobile application of user device 402, an email, a reminder presented in a GUI at the time of payment or any other suitable time. According to some embodiments, the bill splitting system 320 may apply the stored rule to automatically split the bill in accordance with the rule upon determining that the event data corresponds to the reminder.

While the bill splitting system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the bill splitting system 320 may include a greater or lesser number of components than those illustrated.

FIG. 4 is a block diagram of an example system that may be used to interact with payment processing system 408, according to an example implementation of the disclosed technology. The components and arrangements shown in FIG. 4 are not intended to limit the disclosed embodiments as the components used to implement the disclosed processes and features may vary. As shown, payment processing system 408 may interact with a user device 402 via a network 406. In certain example implementations, the payment processing system 408 may include a local network 412, a bill splitting system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the payment processing system 408. In some embodiments, the user device 402 may include or incorporate electronic communication devices for hearing or vision impaired users.

According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

According to some embodiments, user device 402 may be a smartphone device that includes a mobile application that allows a user to interact with payment processing system 408. For example, the mobile application may cause an interactive GUI to be displayed by a touchscreen of the smartphone, which may allow a user to, for example, input payment credentials, review an automatically split bill, verify the bill and authorize payment using the payment credentials, or reject and modify the bill as described herein. Further, according to some embodiments, the smartphone may transmit speech data and/or video data obtained by a microphone/camera of the user device 402 to bill splitting system 320 for processing. Voice and facial recognition applications present on user device 402 may also further assist in identifying a user. For example, if John's smartphone is trained to recognize his face and voice, when he speaks the smartphone will know it is John that is speaking and when it transmits speech data to the bill splitting system 320 that speech data can be labeled with John's name so that the bill splitting system 320 may immediately determine that those utterances are being made by John.

According to some embodiments, user device 402 may be a kiosk or other display screen that is positioned at a restaurant. For example, each table of a restaurant may have its own display screen that includes a microphone to monitor the speech data generated at the table and display bills on an interactive GUI to the users at the table.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The payment processing system 408 may be associated with and optionally controlled by one or more entities such as a business, corporation, individual, partnership, or any other entity that provides one or more of goods, services, and consultations to individuals such as customers. In some embodiments, the payment processing system 408 may be controlled by a third party on behalf of another business, corporation, individual, partnership. The payment processing system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the bill splitting system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

According to some embodiments, web server 410 may include a stored database of voice and/or face data that can be used to compare to speech/face data obtained from users by bill splitting system 320 in order to identify one or more users. In some embodiments, web server 410 may include payment processing software that can process payments for ordered items using payment credentials received from bill splitting system 320 or otherwise already stored by payment processing system 408 in association with an identified user.

The local network 412 may include any type of computer networking arrangement used to exchange data in a localized area, such as WiFi, Bluetooth™, Ethernet, and other suitable network connections that enable components of the payment processing system 408 to interact with one another and to connect to the network 406 for interacting with components in the system 400 environment. In some embodiments, the local network 412 may include an interface for communicating with or linking to the network 406. In other embodiments, certain components of the payment processing system 408 may communicate via the network 406, without a separate local network 406.

The payment processing system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access payment processing system 408 using the cloud computing environment. User device 402 may be able to access payment processing system 408 using specialized software. The cloud computing environment may eliminate the need to install specialized software on user device 402.

In accordance with certain example implementations of the disclosed technology, the payment processing system 408 may include one or more computer systems configured to compile data from a plurality of sources the bill splitting system 320, web server 410, and/or the database 416. The bill splitting system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Although the preceding description describes various functions of a web server 410, a bill splitting system 320, a database 416, and a user device 402, in some embodiments, some or all of these functions may be carried out by a single computing device.

Example Use Case

The following example use case describes an example of a typical user flow pattern. This section is intended solely for explanatory purposes and not in limitation.

In one example, a group of four friends may go to a restaurant to have a meal. While sitting at the table, the system may listen to the conversation of the four friends to identify their respective food orders and rules for determining payment using natural language processing. For example, the first friend may say "I think I'm going to get the fish special," the second friend may say "I want the burger with fries," the third friend may say "I'll have the same thing, but with onion rings instead of fries," and the fourth friend may say "I'm going to order the French dip," and the system (e.g., bill splitting system 320) may determine which food items each person has ordered. The system may gather video data from one or more cameras that it can use to track which individual is making which statement and may use facial recognition techniques to identify each individual. After determining who has ordered what, the system may then listen for rules that can be applied to the orders to modify the payment responsibility. For example, if someone says "Lunch is on me" then the system may determine that that person is going to pay for everyone's meal. Similarly, the system can use natural language processing paired with visual tracking to determine that a statement such as "Hey John, I'll get your meal" means that the first friend intends to pay for the third friend's meal, and the system may automatically place the third friend's ordered food items on the first friend's bill. Further, if the third friend responds with something such as "Thanks Joe, next time it's on me," the system can recognize that the third friend is offering to pay for the first friend's meal in a future outing, can store that information and use it to suggest to the third friend at a future date that they may want to pay for the first friend's meal the next time the system determines they are at a restaurant together. In this way, by passively observing the conversation between people dining together at a restaurant, the system can automatically determine how to split up a bill, thereby making the process of concluding the meal and leaving the restaurant more seamless and enjoyable.

In some examples, disclosed systems or methods may involve one or more of the following clauses:

Clause 1: A bill splitting system comprising: one or more processors; memory in communication with the one or more processors and storing instructions that are configured to cause the bill splitting system to: receive speech data; identify from the speech data and using natural language processing, one or more users; determine, from the speech data and using natural language processing, orders of the one or more users; determine, from the speech data and using natural language processing, rules for the orders of the one or more users; and process one or more payments for the orders based on the rules and one or more credentials associated with the one or more users.

Clause 2: The bill splitting system of clause 1, wherein the memory stores further instructions that are configured to cause the bill splitting system to: receive video data.

Clause 3: The bill splitting system of clause 2, wherein the video data comprises images of faces of the one or more users, and wherein the memory stores further instructions that are configured to cause the bill splitting system to: process the video data to track the speech of the one or more users; and verify, using the video data and facial recognition, an identity of the one or more users.

Clause 4: The bill splitting system of clause 3, wherein the one or more users are identified by a trained machine learning model using speech embeddings and image analysis from the video data.

Clause 5: The bill splitting system of clause 2, wherein the memory stores further instructions that are configured to cause the bill splitting system to: verify, using the video data, the rules.

Clause 6: The bill splitting system of clause 2, wherein the memory stores further instructions that are configured to cause the bill splitting system to: verify, using the video data, the orders of the one or more users.

Clause 7: The bill splitting system of clause 1, further comprising: a microphone, for receiving the speech data; and a camera, for receiving video data.

Clause 8: The bill splitting system of clause 7, wherein the bill splitting system is operated on a smartphone of one or more users, a mobile device of a waiter, a pay-at-the-table device, or combinations thereof.

Clause 9: A bill splitting system comprising: one or more processors; memory in communication with the one or more processors and storing instructions that are configured to cause the bill splitting system to: receive speech data; receive video data; identify, from the speech data and the video data, using a first machine learning model and speech embeddings, one or more users; determine, from the speech data and the video data, orders of the one or more users; determine, from the speech data and the video data, rules for the orders of the one or more users; and charge a balance to one or more associated account of the one or more users based on the rules.

Clause 10: The bill splitting system of clause 9, wherein identifying the one or more users further comprises associating a name with a voice using natural language processing.

Clause 11: The bill splitting system of clause 9, wherein determining the rules uses a second machine learning model.

Clause 12: The bill splitting system of clause 11, wherein the second machine learning model is a transformer deep learning model.

Clause 13: The bill splitting system of clause 9, wherein the memory stores further instructions that are configured to cause the bill splitting system to: send, to the associated account, a receipt.

Clause 14: The bill splitting system of clause 9, wherein the memory stores further instructions that are configured to cause the bill splitting system to: send, to a mobile device associated with the associated account, a request for verification of the balance; and receive, from the mobile device, verification of the balance.

Clause 15: The bill splitting system of clause 14, wherein the request for verification of the balance further comprises an interactive graphical user interface showing the orders of the one or more users, the rules, and a total.

Clause 16: The bill splitting system of clause 15, wherein the interactive graphical user interface is used to modify the orders of the one or more users, the rules, and the total.

Clause 17: A bill splitting system comprising: one or more processors; memory in communication with the one or more processors and storing instructions that are configured to cause the bill splitting system to: receive speech data; receive video data; identify, from the speech data and the video data, using a first machine learning model and speech embeddings, one or more users; determine, from the speech data and the video data, orders of the one or more users; determine, from the speech data and the video data, rules for the orders of the one or more users; determine, from the rules, that long-term storage is required; responsive to determining that the long-term storage is required: store a reminder for a first user based on the rules, the speech data, and voice data; receive event data; determine that the event data corresponds to the reminder; and responsive to determining that the event data corresponds to the reminder: transmit, to the first user, the reminder.

Clause 18: The bill splitting system of clause 17, wherein the event data is the same merchant as a prior event, the same merchant type as the prior event, the same other users as the prior event, or combinations thereof.

Clause 19: The bill splitting system of clause 17, wherein the reminder is a text message, push notification, email message, or combinations thereof.

Clause 20: The bill splitting system of clause 17, wherein determining, from the rules, that long-term storage is required is completed by a variational autoencoder machine learning model.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module." "system," "server," "processor," "memory." and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bill splitting system comprising:
   one or more processors;
   memory in communication with the one or more processors and storing instructions that are configured to cause the bill splitting system to:
   receive speech data;
   identify, from the speech data and using natural language processing, one or more users;
   dynamically and in real-time, determine, from the speech data and using natural language processing, orders of the one or more users by, for each item ordered, identifying which of the one or more users ordered the item and establishing a record of items that have been ordered by each of the one or more users;
   determine, from the speech data and using natural language processing, rules for the orders of the one or more users;
   generate a graphical user interface (GUI) for display by a user device comprising a list of items allocated to a first user of the one or more users, wherein the list of items is dynamically modified in real-time based on the determination of the orders of the one or more users and the rules for the orders of the one or more users; and
   process one or more payments for the orders based on the rules and one or more credentials associated with the one or more users.

2. The bill splitting system of claim 1, wherein the memory stores further instructions that are configured to cause the bill splitting system to:
   receive video data.

3. The bill splitting system of claim 2, wherein the video data comprises images of faces of the one or more users, and wherein the memory stores further instructions that are configured to cause the bill splitting system to:
   process the video data to track speech of the one or more users; and
   verify, using the video data and facial recognition, an identity of the one or more users.

4. The bill splitting system of claim 3, wherein the one or more users are identified by a trained machine learning model using speech embeddings and image analysis from the video data.

5. The bill splitting system of claim 2, wherein the memory stores further instructions that are configured to cause the bill splitting system to:
   verify, using the video data, the rules.

6. The bill splitting system of claim 2, wherein the memory stores further instructions that are configured to cause the bill splitting system to:
   verify, using the video data, the orders of the one or more users.

7. The bill splitting system of claim 1, further comprising:
   a microphone, for receiving the speech data; and
   a camera, for receiving video data.

8. The bill splitting system of claim 7, wherein the bill splitting system is operated on a smartphone of one or more users, a mobile device of a waiter, a pay-at-the-table device, or combinations thereof.

9. A bill splitting system comprising:
   one or more processors;
   memory in communication with the one or more processors and storing instructions that are configured to cause the bill splitting system to:
   receive speech data;
   receive video data;
   identify, from the speech data and the video data, using a first machine learning model and speech embeddings, one or more users;
   dynamically and in real-time, determine, from the speech data and the video data, orders of the one or more users by, for each item ordered, identifying which of the one or more users ordered the item and establishing a record of items that have been ordered by each of the one or more users;
   determine, from the speech data and the video data, rules for the orders of the one or more users;
   generate an interactive graphical user interface (GUI) for display by a user device comprising a list of items allocated to a first user of the one or more users, wherein the list of items is dynamically modified in real-time based on the determination of the orders of the one or more users and the rules for the orders of the one or more users; and
   charge a balance to one or more associated account of the one or more users based on the rules.

10. The bill splitting system of claim 9, wherein identifying the one or more users further comprises associating a name with a voice using natural language processing.

11. The bill splitting system of claim 9, wherein determining the rules uses a second machine learning model.

12. The bill splitting system of claim 9, wherein the memory stores further instructions that are configured to cause the bill splitting system to:
   send, to the associated account, a receipt.

13. The bill splitting system of claim 9, wherein the memory stores further instructions that are configured to cause the bill splitting system to:
   send, to a mobile device associated with the associated account, a request for verification of the balance; and
   receive, from the mobile device, verification of the balance.

14. The bill splitting system of claim 13, wherein the request for verification of the balance further comprises the interactive GUI, wherein the interactive GUI shows the orders of the one or more users, the rules, and a total.

15. The bill splitting system of claim 14, wherein the interactive graphical user interface comprises one or more interactive elements that allow a user to modify one or more of the orders of the one or more users, the rules, and the total.

16. A bill splitting system comprising:
one or more processors;
memory in communication with the one or more processors and storing instructions that are configured to cause the bill splitting system to:
   receive speech data;
   receive video data;
   identify, from the speech data and the video data, using a first machine learning model and speech embeddings, one or more users;
   dynamically and in real-time, determine, from the speech data and the video data, orders of the one or more users by, for each item ordered, identifying which of the one or more users ordered the item and establishing a record of items that have been ordered by each of the one or more users;
   determine, from the speech data and the video data, rules for the orders of the one or more users;
   generate a graphical user interface (GUI) for display by a user device comprising a list of items allocated to a first user of the one or more users, wherein the list of items is dynamically modified in real-time based on the determination of the orders of the one or more users and the rules for the orders of the one or more users;
   determine, from the rules, that long-term storage is required;
   responsive to determining that the long-term storage is required:
      store a reminder for a first user based on the rules, the speech data, and voice data;
      receive event data;
      determine that the event data corresponds to the reminder; and
      responsive to determining that the event data corresponds to the reminder:
         transmit, to the first user, the reminder.

17. The bill splitting system of claim 16, wherein the event data comprises a same merchant as a prior event, a same merchant type as the prior event, a same other users as the prior event, or combinations thereof.

18. The bill splitting system of claim 1, wherein the memory stores further instructions that are configured to cause the bill splitting system to:
   access a menu; and
   for each item ordered, associate the item with a menu item and a corresponding price listed in the menu for the item.

19. The bill splitting system of claim 1, wherein determining rules for the orders of the one or more users comprising:
   determining a first rule;
   subsequent to determining the first rule, determining a second rule that contradicts the first rule; and
   overriding the first rule with the second rule.

20. The bill splitting system of claim 1, wherein the memory stores further instructions that are configured to cause the bill splitting system to:
   determine, from the speech data and using natural language processing, that a termination condition has been met; and
   responsive to determining that the termination condition has been met, automatically process the one or more payments for the orders.

* * * * *